(12) United States Patent
Amato et al.

(10) Patent No.: US 11,055,585 B2
(45) Date of Patent: Jul. 6, 2021

(54) OBJECT DETECTION BASED ON OBJECT RELATION

(71) Applicant: Vintra, Inc., San Jose, CA (US)

(72) Inventors: Ariel Amato, Barcelona (ES); Angel Domingo Sappa, Guayaquil (EC); Carlo Gatta, Barcelona (ES); Bojana Gajic, Barcelona (ES); Brent Boekestein, San Jose, CA (US)

(73) Assignee: Vintra, Inc., San Jose, CA (US)

( * ) Notice: Subject to any disclaimer, the term of this patent is extended or adjusted under 35 U.S.C. 154(b) by 103 days.

(21) Appl. No.: 16/584,400

(22) Filed: Sep. 26, 2019

(65) Prior Publication Data

US 2021/0097354 A1 Apr. 1, 2021

(51) Int. Cl.
*G06K 9/00* (2006.01)
*G06K 9/32* (2006.01)
*G06K 9/68* (2006.01)
*G08B 13/196* (2006.01)
*G06T 7/20* (2017.01)

(52) U.S. Cl.
CPC ....... *G06K 9/6857* (2013.01); *G06K 9/00261* (2013.01); *G06K 9/3233* (2013.01); *G06T 7/20* (2013.01); *G08B 13/1961* (2013.01)

(58) Field of Classification Search
CPC .......... G06K 9/00362; G06K 9/00369; G06K 9/00375; G06K 9/3233; G06K 9/3241; G06K 9/6857; G06K 9/72; G06K 9/726; G06T 2207/20016; G08B 13/19602; G08B 13/19613
See application file for complete search history.

(56) References Cited

U.S. PATENT DOCUMENTS

| | | | |
|---|---|---|---|
| 2009/0080695 A1* | 3/2009 | Yang | G06K 9/3241 382/103 |
| 2014/0369558 A1* | 12/2014 | Holz | G06K 9/2036 382/103 |
| 2016/0065861 A1* | 3/2016 | Steinberg et al. | G06K 9/00228 348/239 |
| 2018/0239972 A1* | 8/2018 | Biemer et al. | G06K 9/3258 |

* cited by examiner

*Primary Examiner* — Andrew W Johns
(74) *Attorney, Agent, or Firm* — Schwegman Lundberg & Woessner, P.A.

(57) ABSTRACT

Various embodiments described herein provide for detection of a particular object within a scene depicted by image data by using a coarse-to-fine approach/strategy based on one or more relationships of objects depicted within the scene.

20 Claims, 10 Drawing Sheets

OBJECT DETECTION BASED ON OBJECT RELATION

TECHNICAL FIELD

The present disclosure relates generally to machine learning, and, more particularly, various embodiments described herein provide for systems, methods, techniques, instruction sequences, and devices for a neural network that detects an object depicted in image data based on object relation.

BACKGROUND

Machine learning (ML) has evolved significantly over the years and, more recently, Artificial Deep Neural Networks (ADNNs) have become a dominant technology in the domain of ML. Applications based on ADNNs, such as deep learning, can be able to learn a unique data representation of a given object to localize it in any unseen image (e.g., a single digital image or a digital image stream).

In the computer vision domain, the object detection can be defined as a task of localizing the region that contains the searched object in the given image. In other words, the object detection task consists in detecting the position in the given image (referred to the image coordinate system) and the size of the region (referred to image pixel) that contains the object being search for. Traditional approaches detect and object by exploring the given image at different scales, by using descriptive features. An object can be searched by using its own descriptive features.

Generally, generating an ML model (e.g., ADNN) for detecting an object within a scene depicted by image data involves the ML model learning descriptive features, which become a unique representation of the object in a manner that is robust to changes in the depicted scene (e.g., point of view, scale, illumination, partial occlusions, which can depend on the position and location of the digital image capture device). The learned descriptive features are used by the ML model to identify the object. Traditionally, descriptive features of an object have been obtained by manual means (e.g., hand-crafted approaches, such as those associated with a Gabor, SIFT, or HOG-based Convolutional Neural Networks (CNN)) or by using Deep Convolutional Neural Networks (CNN)-based approaches, where image features extraction and object detection are performed in the same pipeline. Traditional approaches for obtaining object descriptive features often involve exploring the entirety of a digital image (e.g., single frame of a digital video), at different scales, to decide whether one or more descriptive features are present in what is depicted by the digital image.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
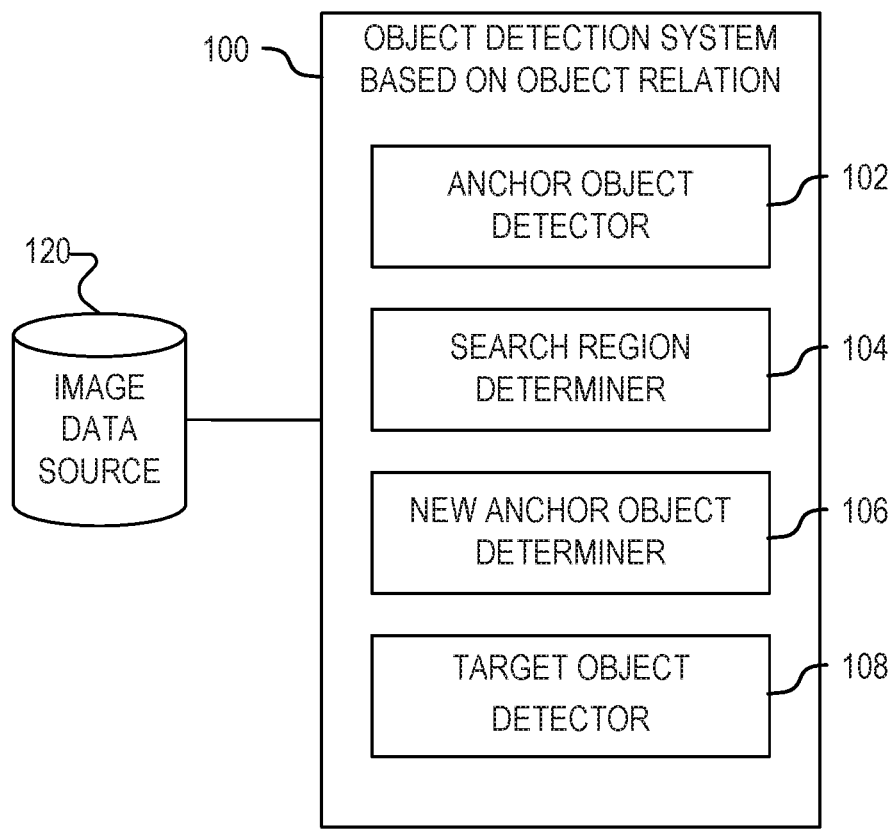
FIG. 1 is a block diagram illustrating an example object detection system based on object relation, according to various embodiments of the present disclosure.

Traditional approaches for obtaining object descriptive features from image data (e.g., a digital image) can be quite time consuming, given that they usually involve exploring the entirety of a digital image (e.g., single frame of a digital video), at different scales. Some conventional strategies have attempted to reduce this exhaustive search by constraining the object exploration to a particular space/area of a scene depicted by image data, where the particular space/area is constrained based on the prior-knowledge of the scene, and where the object exploration involves a brute-force exploration of the particular space/area. Unfortunately, while such conventional strategies may reduce processing time, they do not improve object detection rates. For example, in the cases mentioned above, the original high resolution given image (e.g., image that is thousands of pixels by thousands pixels) may never be processed but a resized smaller resolution of it may be considered (e.g., image that is hundreds of pixels by hundreds of pixels).

In comparison to traditional object detection approaches, various embodiments described herein implement "object detection" based on both an object's own descriptive feature plus the object's relationships with other objects in the depicted scene. Various embodiments described herein can improve a computing device's ability to perform object detection by reducing processing time used to perform the object detection (e.g., through a coarse-to-fine strategy) and by increasing the object detection rate achieved by the computing device (e.g., through exploiting a higher resolution representation and a larger relative object size). In doing so, various embodiments can improve the robustness and efficiency in visual object recognition tasks.

According to various embodiments, detection of a particular object (target object) within a scene depicted by image data (e.g., a single digital image or a digital image stream) is performed using a coarse-to-fine approach/strategy based on one or more relationships (e.g., object-spatial relationships) of objects depicted within the scene. Some embodiments use object relationship information (e.g., object spatial relationship information), regarding an object to be recognized (also referred to herein as the "target object") within a scene (depicted by image data) and another object depicted in the scene (also referred to herein as the "anchor object") that is known (or discovered) to be related to the target object, to detect the presence of the target object in the scene. With respect to a given target object, an anchor object detected for in the scene can be one that is directly related and spatially depicted in the scene relative to the target object. The scene depicted by the image data may include one or more objects that are related to the target object (e.g., anchor objects), and one or more objects that are unrelated to the target object. For some embodiments, an anchor object being detected for in a scene (in connection with detecting a given target object in the scene) comprises an object that has a higher detection rate than the target object. With respect to a given target object, examples of an anchor object can include, without limitation: an object that is related to the given target object and that usually has a larger relative size in the scene than the target object (e.g., generally the larger the object size, the better the detection rate); and an object belonging to an object category that is detected by an ML model (e.g., first CNN) more accurately than an ML model (e.g., second CNN) used to detect for the target object. With respect to this last example of anchor objects, the ML model (e.g., first CNN) used to detect an anchor object within a scene can be more accurate than the ML model (e.g., second CNN) used to detect the target object for various factors, such as: training approach used to train the ML model (e.g., first CNN) used to detect the anchor object; quantity and/or quality of training data used to train the ML model (e.g., first CNN) used to detect the anchor object; and the intrinsic composition of the anchor object (e.g., the anchor object has higher salient and unique features that simplify its detection by the first CNN) versus the intrinsic composition of the target object. Depending on the embodiment, the ML model (e.g., the CNN) used to detect an anchor object within a scene can be the same ML model (e.g., the same CNN) used to detect a target object within the scene.

Various embodiments perform detection of a target object (e.g., human hands) within a scene depicted by image data (e.g., digital image or digital image stream) by localizing on one or more anchor objects depicted in the scene (e.g., anchor objects that are related to the target object and have a higher object detection rate, such as individual humans that in this case, at the same search scale, is significantly larger than the target object of human hands). In this way, such embodiments can restrict or constrain spaces/areas of the scene in which the target object is searched to a set of regions of the scene that are "anchored" to objects having high detection rates (e.g., that are easier to detect) than the target object (e.g., human hands). Use of "anchored" regions permits some embodiments to avoid object exploration of the entire depicted scene (e.g., avoid exploring whole image) for the target object and avoid object exploration using traditional predefined regions of the depicted scene. Various embodiments determine (e.g., predict) a set of regions relative to (e.g., surrounding) the location of one or more anchor objects detected in a scene of a digital image. Various embodiments search (e.g., explore) determined regions for an object (e.g., target object or another anchor object) at a higher resolution than the original resolution of those determined regions, thereby increasing the detection rate of the object within those regions. In the case of the same resolution, various embodiments increase the object detection rate due to the fact the anchor object has a higher detection rate, which not only assists in the search for the target object but also reduces the false positive rate since the various embodiments search on a region where there is a higher probability of finding the target object. Additionally, various embodiments implement a coarse-to-fine approach/strategy to search for a target object, whereby multiple levels of detected anchor objects and determined regions are used to determine a final set of regions in which a target object is searched. Various embodiments described herein use a coarse-to-fine approach/strategy that can increase object detection rate by an ML model (e.g., CNN) and that can reduce object detection processing time. According to the approach/strategy, various embodiments detect for one or more anchor objects that relate (e.g., are associated with or spatially relate) to a target object that is to be recognized and that has a higher object detection rate than the target object. Once one or more anchor objects are detected, one or more search regions can be determined (e.g., defined) relative to the one or more anchor objects by a region predictor system (e.g., that determines a predicted region around objects), in which another anchor object or the target object can be detected for (e.g., searched). In this way, various embodiments can use region definition (e.g., bound box detection) to detect for an object.

According to some embodiments, the object detection processing time is reduced by the determination of one or more regions of a scene (depicted by a given image) relative to one or more anchor objects in the scene, which adaptively constrains object search space for another anchor object or a target object. This is in contrast to traditional object detection methodologies that use a predefined set of regions to reduce object detection processing time. Various embodiments also improve detection rate of a target object by detecting for objects in one or more regions at a higher resolution with a larger relative size between the target object and the given image region. For some embodiments, partial occlusions in the target object are better handled based on using higher resolution regions (if available), a larger relative size, or both.

For some embodiments, the coarse-to-fine approach/strategy is applied in a recursive (or iterative) manner to determine finer-and-finer regions relative to anchor objects (e.g., as many times as an object detection problem can be described), thereby providing several levels of refinement, increased resolution and/or larger relative object size when searching for a target object within a scene. This recursive (or iterative) application of the coarse-to-fine approach/strategy described herein can go up to an image-relative scale where the best object recognition performance is reached. For instance, an example of a three-level object detection process for suitcases can comprise: object detection for a human individual in a scene depicted by an initial image; object detection for a human hand in one or more regions of the scene determined (e.g., defined) relative to detected human individual(s); and object detection for a suitcase in one or more sub-regions (of the one or more regions) relative to detected human hand(s). Another example of a three-level object detection process for weapons can comprise: object detection for a human individual in a scene depicted by an initial image; object detection for a human hand in one or more regions of the scene determined (e.g., defined) relative to detected human individual(s); and object detection for a weapon in one or more sub-regions (of the one or more regions) relative to detected human hand(s).

An example four-level object detection process for detecting a helmet in a digital image (e.g., of a city street) can comprise: object detection of a motorcycle or bicycle in a scene depicted by the digital image; object detection for a human individual on the motorcycle/bicycle in one or more regions of the scene determined (e.g., defined) relative to detected motorcycle/bicycle(s); object detection for a human head in one or more sub-regions (of the one or more regions) relative to detected human individual(s); and object detection for a helmet in one or more sub-regions (of the one or more sub-regions) relative to detected human head(s). With respect to this example, the relative size of the helmet, with respect to the size of the given digital image size, is smaller in comparison with the relative size of the motorcycle/bicycle, the human individual, and the human head with respect to the size of the given digital image. Additionally, the helmet can have a reduced number of features (in comparison to the descriptive features of the motorcycle/bicycle, the human individual, or the human head) and, as such, a machine learning model (e.g., CNN) for detecting a helmet can have a lower detection rate with respect to motorcycle/bicycle, human body, and human head categories of objects.

To illustrate how searching determined regions can be helpful, the following Table 1 lists example object detection rates (using machine learning model) for different objects based on their relative sizes within a given digital image, which is assumed to have a higher image resolution at each relative size. Table 1 illustrates how two factors (i.e., image resolution and object relative size) can be directly related and considered by various embodiments described herein. Specifically, Table 1 provides detection rates for different relative sizes from a given machine learning approach. Once an anchor/target object is defined, a new search region can be considered, which can result in an image with a larger relative size of the following anchor/target, at a higher resolution (if available), or both. In this way, the two factors can assist in increasing the object detection rate. In the case of Table 1, when a coarse-to-fine process described herein can reach the given original image resolution (e.g., the highest resolution possible via the original image), the process can continue to iterate by exploiting the increase in the object relative size until the deepest level in the anchor object hierarchy is reached.

TABLE 1

| Object Type | Relative size (object size with respect to the image size, in percentage) | | | | | |
| --- | --- | --- | --- | --- | --- | --- |
| | 90% | 70% | 50% | 30% | 20% | 5% |
| Human Individual | 92 | 89 | 87 | 82 | 60 | 13 |
| Helmet | 88 | 82 | 75 | 70 | 43 | 9 |
| Helmet Logo Brand | 83 | 75 | 68 | 60 | 38 | 4 |

Assume a case study where a "helmet logo brand" needs to be detected in the given image, which corresponds to an outdoor urban scenario. Since a "helmet logo brand" is being searched for, assume the "helmet" is worn by a person. Assuming that the relative size of a "human individual" is about 30% of the given image, at that scale the relative size of the "helmet logo brand" with respect to the given image would be smaller than 5%, which would result in an object detection rate lower than 4%. Additionally, at that scale the "helmet" detection rate would be about 9%. Accordingly, it would be very difficult to detect the "helmet logo brand" by just searching for it in the given image, and a similar challenge would exist with respect to just searching for the "helmet" in the given image. However, using the coarse-to-fine approach/strategy describe herein, a first anchor object of a "human individual" can first be detected in an original version of the given digital image (at a 82% detection rate), and a region (e.g., bounding box) of the given digital image can be determined relative to the first anchor object (i.e., detected "human individual").

In next/new iteration, a second anchor object of a "helmet" can be searched in the determined region at a higher resolution (if available), with a larger relative size, or both. According to Table 1, the second anchor object (the "helmet") is 70% of the image for the determined region being searched, thereby improving the second anchor object's detection rate from 9% (with respect to its 5% relative size in the original given digital image) to 82%. After the "helmet" has been detected, a sub-region (e.g., bounding box) of the (prior) region can be determined relative to the second anchor object (i.e., the "helmet").

In last/new iteration, the target object (i.e., a "helmet logo brand") can be searched in the determined region at a higher resolution (if available), with a larger relative size, or both. According to Table 1, the target object (the "helmet logo brand") is 90% of the image being searched, thereby improving the target object's detection rate from 4% (with respect to its 5% relative size in the original given digital image) to 83%. It should be noted that at each iteration of this coarse-to-fine searching process, a higher resolution image can be considered when available, and in the event that the highest image resolution has been reached (e.g., native resolution of the original image) by the previous iteration, the iterative process can continue to exploit object relationships. Table 1 depicts detection rates for example objects independently according to their relative size, but does not take into account object relationships that allows some embodiment described herein to increase those values based on reduction of false positive rates. Image resolution is not considered in Table 1, and an increase in the image resolution can be used at each iteration if available (e.g., could go up to the highest image resolution provided via the original image).

As used herein, image data can comprise a digital image stream, a digital image, or one or more frames from a digital image stream. Additionally, a target object is an object being searched for in a given digital image. An anchor object can comprise an object related to a target object that is being searched for in a given digital image. Relative to a target object, an anchor object can have a relative size that is larger than the target object and that has a higher object detection rate than the target object. For various embodiments described herein, an initial image comprises a down-sampled version of an original image (e.g., captured by a digital image capture device) provided by the image data. Relative to the initial image, regions with varying levels of higher resolutions can be generated from the original image by down-sampling the original image at varying levels that are less than the level of down-sampling used to generate the initial image. For instance, an original image can have a resolution of 1080 by 1080 pixels, an initial image can be generated from the original image by down-sampling the original image to a resolution of 300 by 300 pixels, and a region associated with a first anchor object can be generated from the original image, by extracting (e.g., cropping) the region from the original image and down-sampling the extracted region to a resolution of 500 by 500 pixels, and so on. In this instance, the highest resolution region attainable could be 1080 by 1080.

The description that follows includes systems, methods, techniques, instruction sequences, and devices that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example object detection system 100 based on object relation, according to various embodiments of the present disclosure. As shown, the object detection system 100 is communicatively coupled to an image data source 120, and comprises an anchor object detector 102, a search region determiner 104, a new anchor object determiner 106, and a target object detector 108. Depending on the embodiment, the object detection system 100 can be implemented (at least in part) by a machine similar to the one described below with respect to FIG. 10, and can use a software architecture similar to the one described below with respect to FIG. 9. For various embodiments, the components and arrangement of components may vary from what is illustrated in FIG. 1.

The image data source 120 comprises a data source (e.g., database) to store, and provide the object detection system 100 with, image data that can be processed by the object detection system 100 for target object detection. The image data can be generated by a digital image capture device, such as a digital surveillance camera (e.g., digital security camera), which may be deployed in an outdoor environment. As described herein, the image data can comprise a digital image stream, a digital image, or one or more frames from a digital image stream. The image data can provide an original image, from which an initial image and images corresponding to regions can be generated.

The anchor object detector 102 can detect an anchor object within a digital image (e.g., within a scene depicted by the digital image) or within a region determined relative to a previously-detected anchor object (e.g., within a bounding box around the previously-detected anchor object), where the region defines (e.g., constrains) the search space/area for a next object (e.g., target object or another anchor object). The anchor object detector 102 can comprise one or more machine learning (ML) models, such as one or more convolution neural networks (CNNs) or expert detectors, which can process a digital image (e.g., depicted scene or region thereof) and detect an object depicted within the digital image. Depending on the embodiment, the anchor object detector 102 can use a single ML model (e.g., single CNN), or different ML models (e.g., two different CNNs), to detect for different types of anchor object (e.g., human head detection versus human hand detection).

The search region determiner 104 can determine (e.g., define) a region, such as a bound box, relative to an anchor object detected by the anchor object detector 102. The search region determiner 104 can comprise a region predictor system (e.g., one or more ML models separate from those of the anchor object detector 102 or the target object detector 108), which propose a new search area where potentially the target object or a new anchor might be located. After new set of regions is determined by the search region determiner 104, the new anchor object determiner 106 can determine whether another anchor object (not been detected for by the anchor object detector 102 during a prior iteration) is to be detected for in the new set of regions. If another anchor object is not to be detected for, the new anchor object determiner 106 can cause the target object detector 108 to detect for the target object in the new set of regions determined by the search region determiner 104.

The target object detector 108 can perform this detection both at a larger relative size between the target object and given image region and at a higher resolution than the original resolution of the new set of regions. The target object detector 108 can comprise one or more machine learning (ML) models, such as one or more convolution neural networks (CNNs) or expert classifiers, which can process a digital image (e.g., the set of regions) and detect for an object depicted within the digital image. If another anchor object is to be detected for, the new anchor object determiner 106 can cause the anchor object detector 102 to detect for the other anchor object in the new set of regions (at a higher resolution than the original resolution of the new set of regions) and, subsequently, the search region determiner 104 can determine another set of regions relative to one or more anchor objects detected by the anchor object detector 102. More regarding operation of the object detection system 100 is described below with respect to figures that follow.

Figure 2:
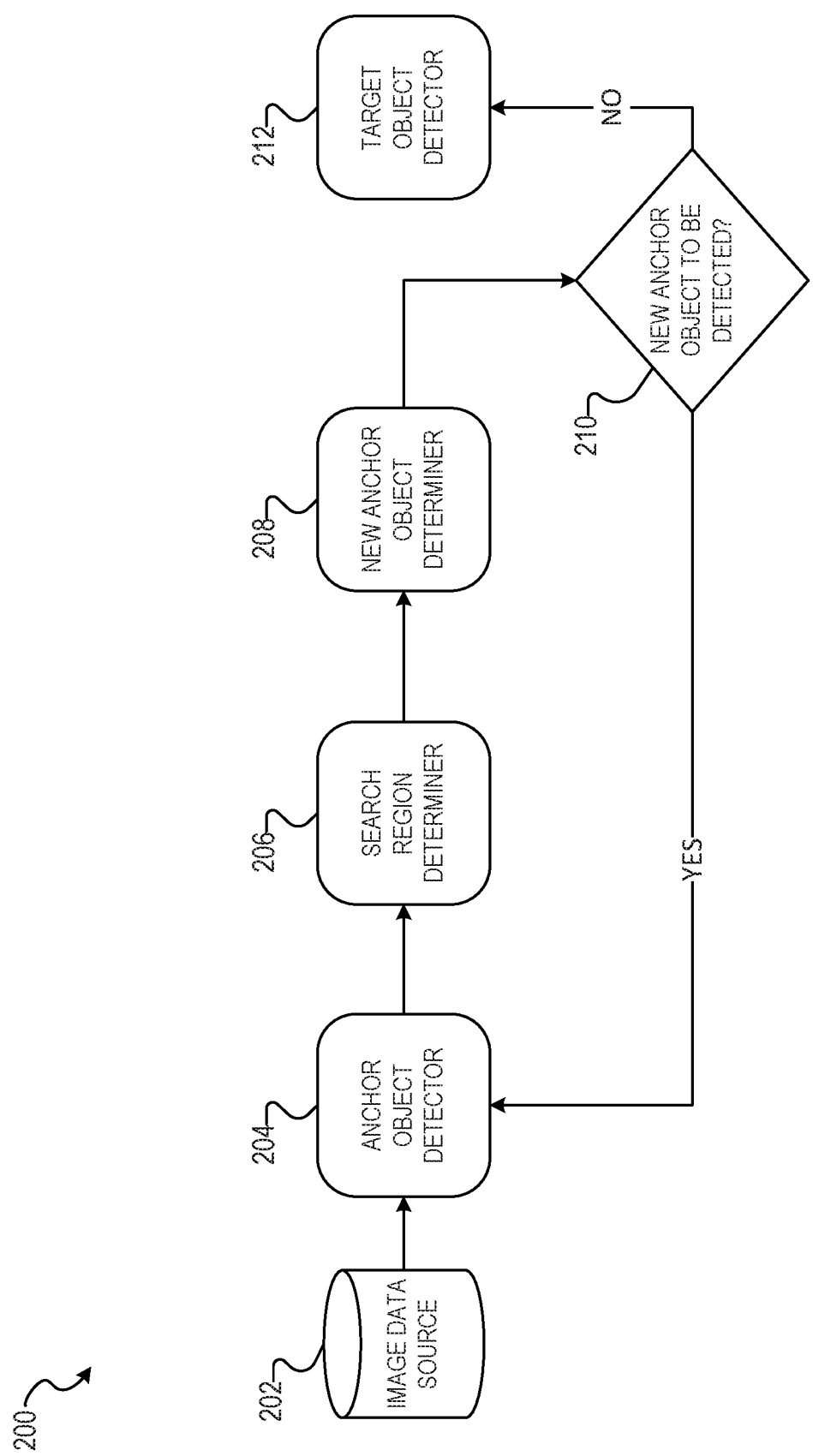
FIG. 2 is a flow diagram illustrating a pipeline for an example object detection process based on object relation, according to various embodiments of the present disclosure.

FIG. 2 is a flow diagram illustrating a pipeline 200 for an example object detection process based on object relation, according to various embodiments of the present disclosure. According to some embodiments, the pipeline 200 is implemented with respect to an objection system described herein, such as the object detection system 100 described above with respect to FIG. 1. In FIG. 2, an image data source 202 (e.g., a database storing a digital image or a digital image stream) can provide a digital image (e.g., original image) for object detection processing. An anchor object detector 204 can detect for a first anchor object in a scene depicted by the digital image, and a search region determiner 206 can determine a region in the digital image relative to (e.g., surrounding) the first anchor object detected by the anchor object detector 204. Subsequently, a new anchor object determiner 208 can determine whether another (new) anchor object is to be detected for in the determined region search towards a target object). If not, the new anchor object determiner 208 can cause a target object detector 212 to detect for the target object in the determined region, and to do so at a larger relative size between the target object and given image region, a higher resolution (if available) than the current resolution of the determined region, or both.

If another (new) anchor object is to be detected for in the determined region, another interval of the pipeline 200 is performed. In particular, the new anchor object determiner 208 can cause the anchor object detector 204 to detect for the other anchor object (e.g., a second anchor object) in the determined region, and to do so at a higher resolution than the current resolution of the determined region. The search region determiner 206 can then determine a sub-region (of the previously-determined region) relative to the other anchor object detected by the anchor object detector 204. The pipeline 200 then continues as before, with the new anchor object determiner 208 determining whether another (new) anchor object is to be detected for in the determined sub-region (in search towards a target object).

As shown by the pipeline 200, multiple iterations of anchor object detection (by the anchor object detector 204) and region determination (by the search region determiner 206) can be performed prior to a target object being searched (by the target object detector 212) in the final set of determined regions (by the search region determiner 206). The multiple iterations can implement a coarse-to-fine approach/strategy for using detection of multiple levels of anchor objects to refine (e.g., constrain) an image search space for detecting the target object.

Figure 3:
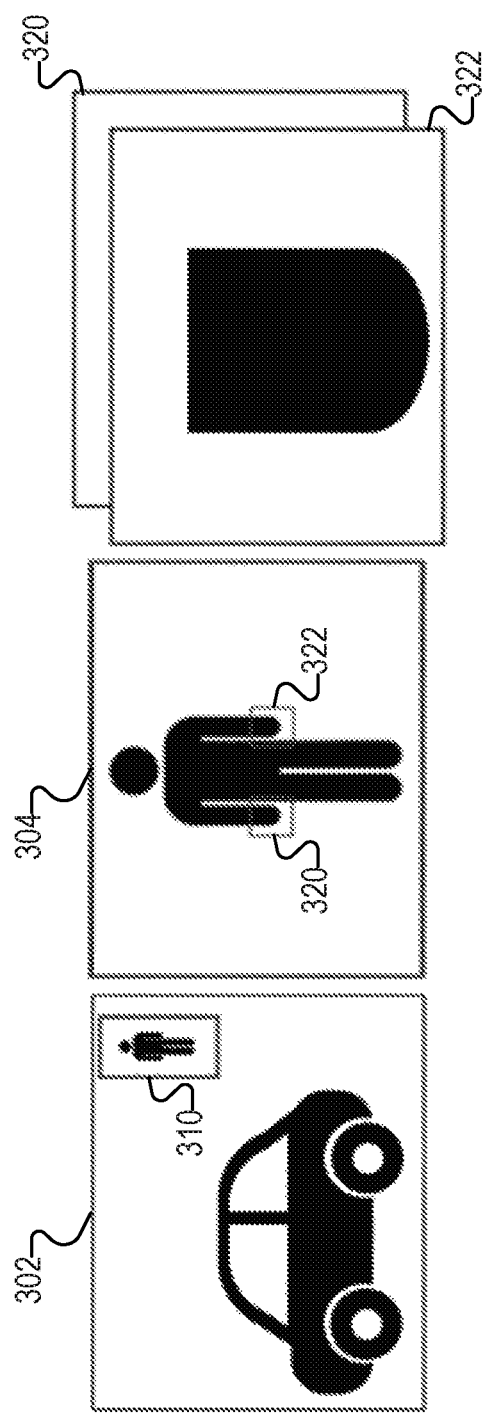
FIG. 3 illustrates application of an example object detection process based on object relation, according to various embodiments of the present disclosure.

FIG. 3 illustrates application of an example object detection process based on object relation, according to various embodiments of the present disclosure. In particular, FIG. 3 illustrates an object detection process based on object relation where the target object is one or more human hands. In FIG. 3, image 302 can represent an initial image that depicts a scene including a vehicle and a human individual. As used herein, an initial image can be one that is down-sampled from an original image that was captured by a digital image capture device. Within the image 302, the object detection process can detect for (e.g., search for) one or more human individuals, which can serve as one or more anchor objects within the scene. The object detection process can then determine (e.g., identify) one or more regions relative to the one or more human individuals detected in the scene of the image 302, such as region 310, that constrains a single human individual. The object detection process can search the determined one or more regions, such as the region 310, for an object at a larger relative size or higher resolution (if available), or both. Image 304 represents the region 310 at a higher resolution than region 310. The image 304 can be generated based on resizing the region 310 to a higher resolution. Thereafter, the object detection process determines that another anchor object is not to be detected in the determined one or more regions and, as such, the object detection process can detect for one or more target objects (i.e., one or more human hands) in the determined one or more regions at the higher resolution (i.e., the image 304). Accordingly, the object detection process can detect human hands 320 and 322 in the image 304.

FIG. 3 illustrates a coarse-to-fine object detection strategy of some embodiments, where a determined (e.g., constrained) region is explored for an object (e.g., anchor object or target object) at a higher resolution. Such a strategy can achieve increased recognition ratio over a traditional methodology, as the size of a target object (i.e., one or more human hands) relative to the initial image (i.e., the image 302) depicting the target object is increased.

Figure 4:
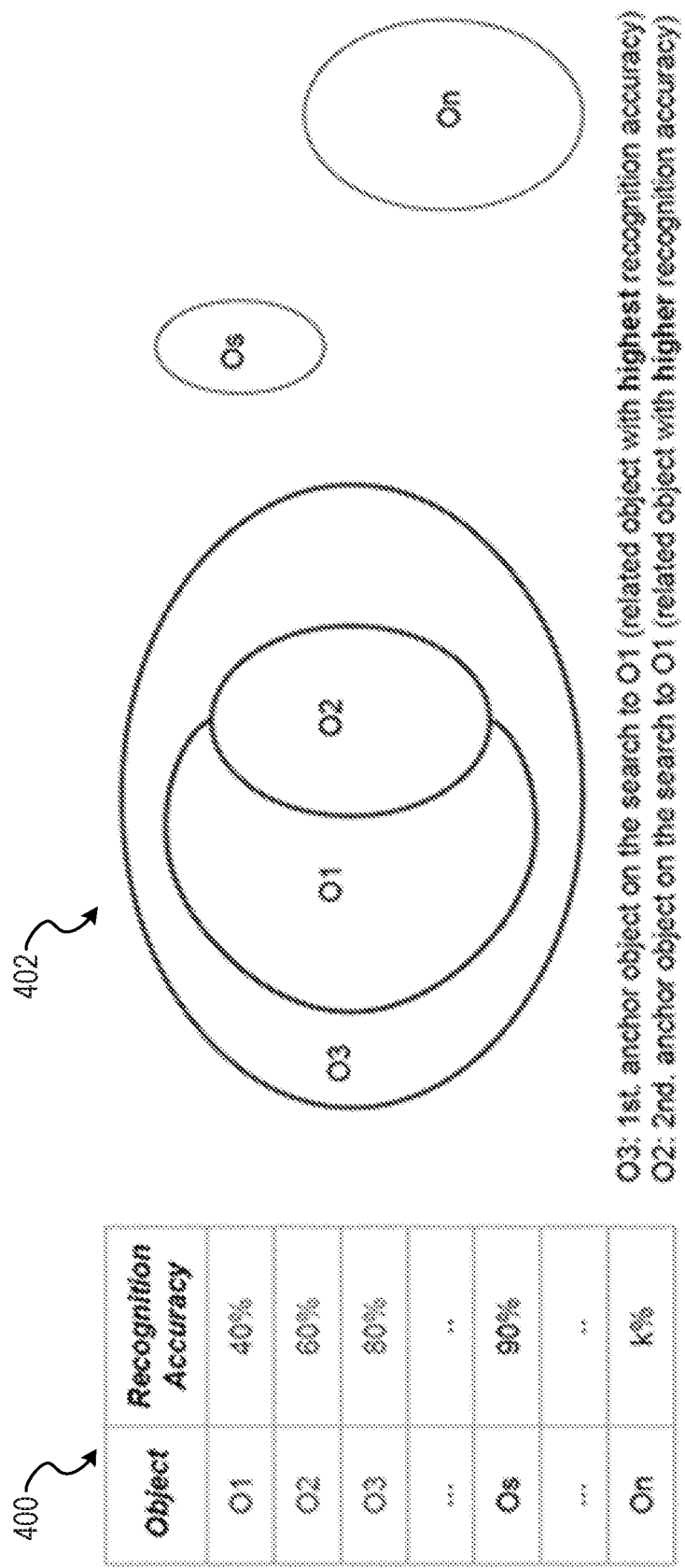
FIG. 4 provides a diagram illustrating a relationship between an example target object and example anchor objects that can be processed by various embodiments of the present disclosure.

FIG. 4 provides a diagram 402 illustrating a relationship between an example target object and example anchor objects (associated with the example target object) that can be processed by various embodiments of the present disclosure. In FIG. 4, object O1 is the target object that an example object detection system (described herein) is attempting to recognize. Objects O3 and O2 represent anchor objects related to object O1 and, as such, objects O3 and O2 can be used by an example object detection system to search for object W. As shown, the table 400 describes the object detection accuracy for objects O1 through On. The diagram 402 illustrates that the recognition of O3 is related with objects O1 and O2, but the recognition of objects Os and On are not related with objects O1 and O2. Objects O3 and O2 are related to object O1 and have an object detection accuracy that is higher than that of object O1. Accordingly, for some embodiments, objects O3 and O2 serve as anchor objects for detecting for the target object (object O1). Other objects could have higher object detection rate (e.g., objects Os and On as described in the table 400), but those other objects are not related with objects O3, O2, and O1 and hence are not considered as anchor objects.

Object O3 has a higher detection accuracy than object O2, and object O2 has a higher detection accuracy than object O1. Accordingly, object O3 can be used as the first anchor object to be detected, and object O2 can be used as the second anchor object to be detected. As anchor objects, objects O3 and O2 can prune a search space/area of a digital image for searching for the target object, object O1. The coarse-to-fine search approach/strategy can comprise first detecting object O3, and in case object O3 is detected, then object O2 can be detected for in a region (e.g., bounding box) relative to the detected object O3. In case object O2 is detected, object O1 (the target object) is detected for in a region relative to the detected object O2.

Figure 5:
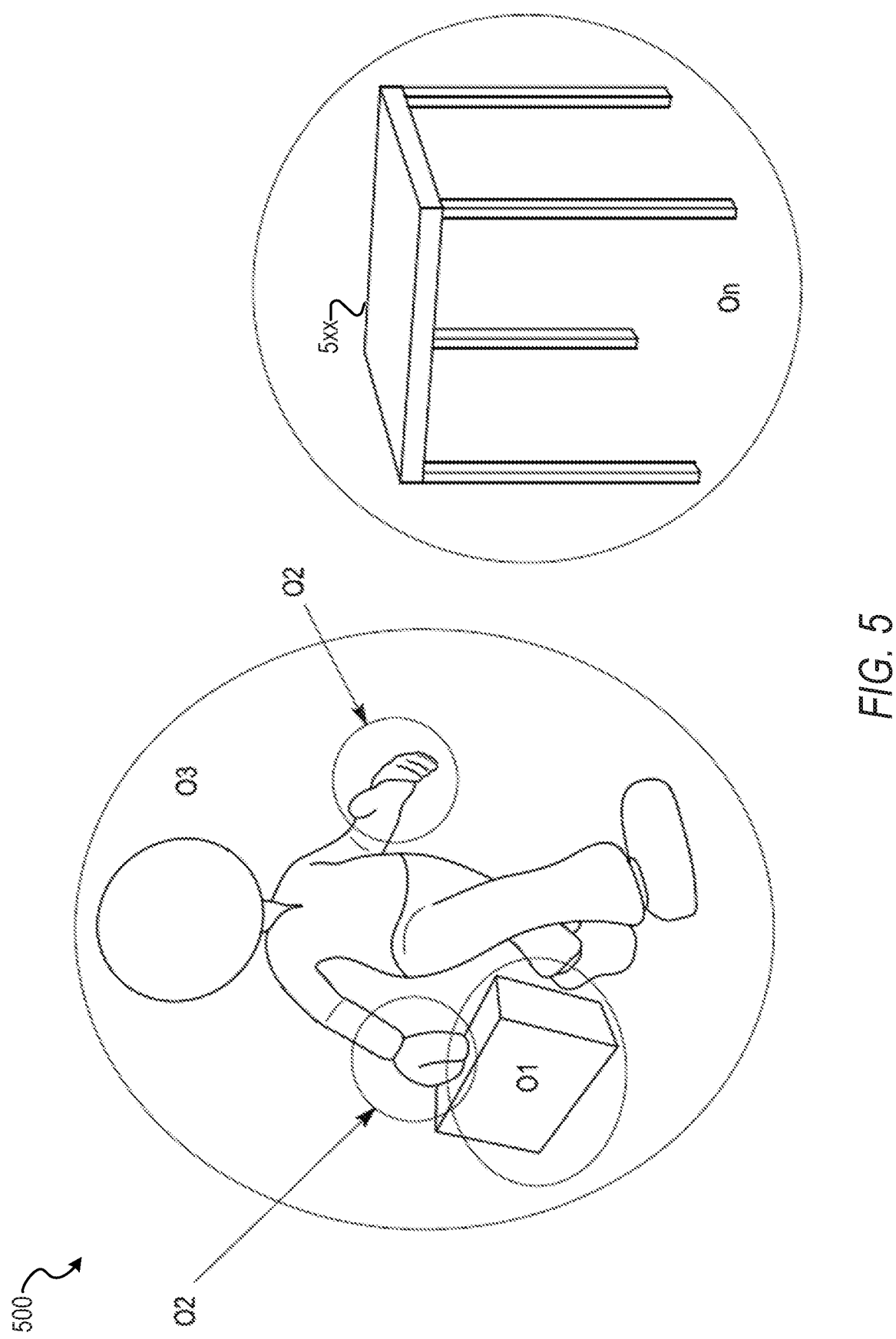
FIG. 5 is a diagram illustrating application of an example object detection process based on object relation with respect to an example scene, according to various embodiments of the present disclosure.

FIG. 5 is a diagram illustrating application of an example object detection process based on object relation with respect to an example scene 500, according to various embodiments of the present disclosure. In particular, FIG. 5 illustrates an application focused on detecting for a carried suitcase in the scene 500. As described herein, the scene 500 can be one depicted by a digital image (e.g., down-sampled version of an original image captured by a digital security camera). In FIG. 5, features of a carried suitcase (the target object) can be enriched using the prior knowledge that a hand is nearby, and a human individual should be also be present in the scene. Assuming that an object category of human individual has a highest object detection rate for this application, an object detection system described herein can start by detecting human individuals (object O3) in the given image. If a human individual is detected, then hands (object O2) can be searched in regions determined relative to a detected human individual. As described herein, the regions can be determined by predicting a localization of a second anchor object (object O2) relative to detected human individual (object O3), where the determined region can be explored at a higher resolution than the current resolution of the region. Once one or more hands (object O2) are detected, a suitcase (object O1) can be detected in one or more regions determined relative to the detected hands (object O2). Again, the one or more regions (determined relative to the hands) can be explored at a higher resolution than the current resolution of those one or more regions. In this way, the carried suitcase will not be searched through the whole digital image.

Figure 6:
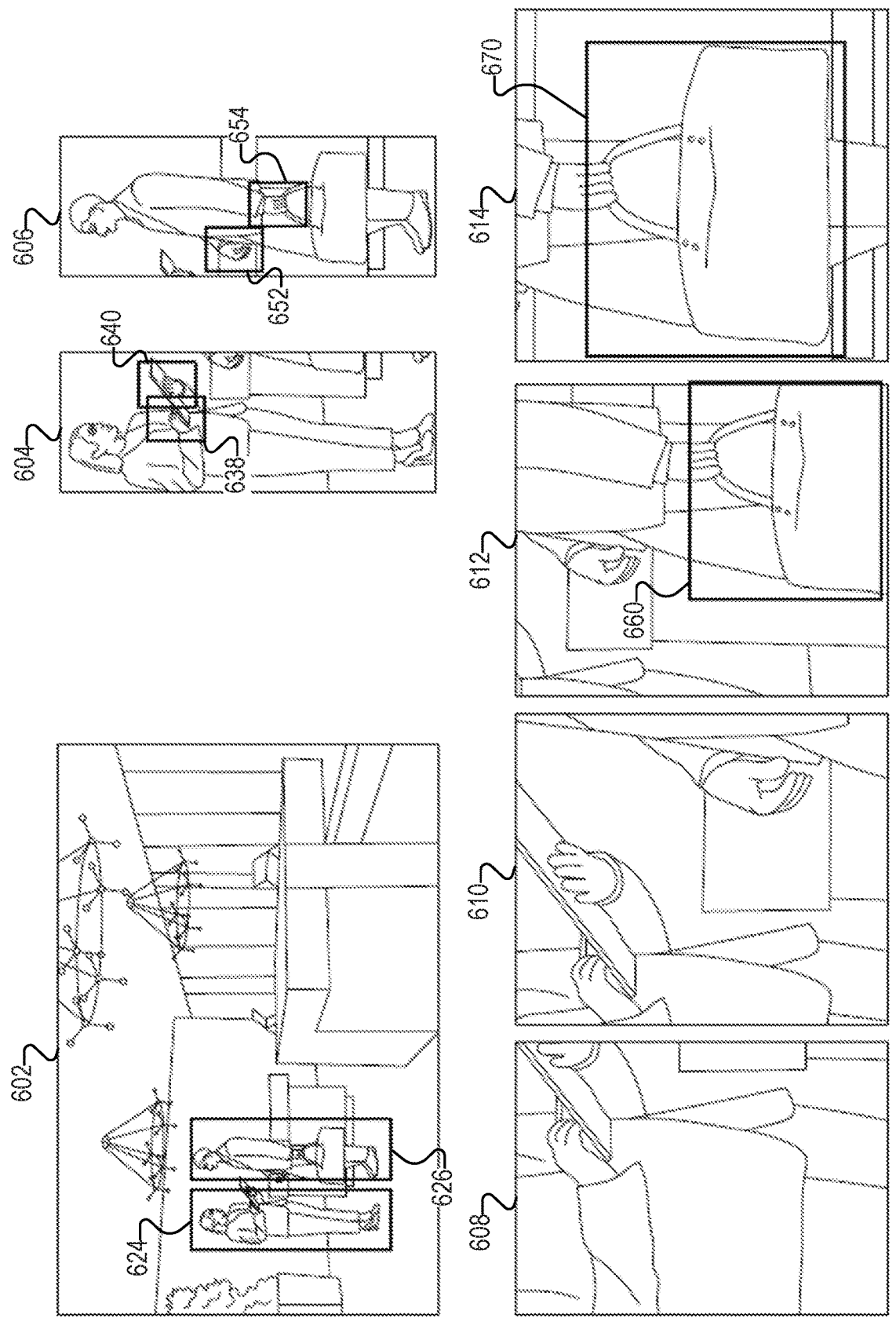
FIG. 6 illustrates an example scene that can be processed by an example object detection process based on object relation, according to various embodiments of the present disclosure.

FIG. 6 illustrates an example scene 602 (depicted by a digital image) that can be processed by an example object detection process based on object relation, according to various embodiments of the present disclosure. Similar to FIG. 5, FIG. 6 illustrates an application focused on detecting for a carrier suitcase in the scene 602. An example object detection process described herein processes the scene 602 by first detecting for a human individual as a first anchor object. As shown, the object detection process detects two human individuals in the scene 602, and determines regions 624, 626 (e.g., bound boxes) those detected human individuals.

Upon determining that another (second) anchor object (comprising a human hand) is to be detected for in the determined regions 624, 626, the object detection process can detect for a human hand in each of the regions 624, 626 and do so at a higher resolution than the current resolution of the regions 624, 626. The higher resolution of the regions 624 and 626 is represented by images 604 and 606 respectively. The increase on relative size of (second) anchor object (i.e., hands) can be appreciated by comparing them in 604 and 606 with respect to their relative size in 602. For some embodiments, each of the images 604 and 606 is generated by resizing up (e.g., resizing up to $Wa_1 \times H$) the regions 624 and 626. Subsequently, upon the object detection process detecting hands in each of the images 604 and 606, the object detection process determines sub-regions 638, 640 (e.g., bound boxes) around the detected human hands in the image 604, and determines sub-regions 652, 654 (e.g., bound boxes) around the detected human hands in the image 606.

Upon determining that another (third) anchor object does not need to be detected for in the determined sub-regions, the object detection process can detect for a target object (carried suitcase) in the determined sub-regions 638, 640, 652, 654; the object detection process can detect for a carrier suitcase in each of the sub-regions 638, 640, 652, 654 and do so at a higher resolution than the current resolution of those sub-regions 638, 640, 652, 654. The higher resolution of the sub-regions 638, 640, 652, and 654 is represented by images 608, 610, 612, and 614 respectively. Again, this coarse-to-fine process can take advantage of higher resolution representations and can also benefit on the increase on relative size between the target object and the given image region. For some embodiments, each of the images 608, 610, 612, and 614 is generated by resizing up (e.g., resizing up to $Wa_2 \times H$) the sub-regions 638, 640, 652, and 654. Subsequently, the object detection process detects a carried suitcase in each of the images 612 and 614, as highlighted by boxes 660 and 670 respectively.

Figure 7:
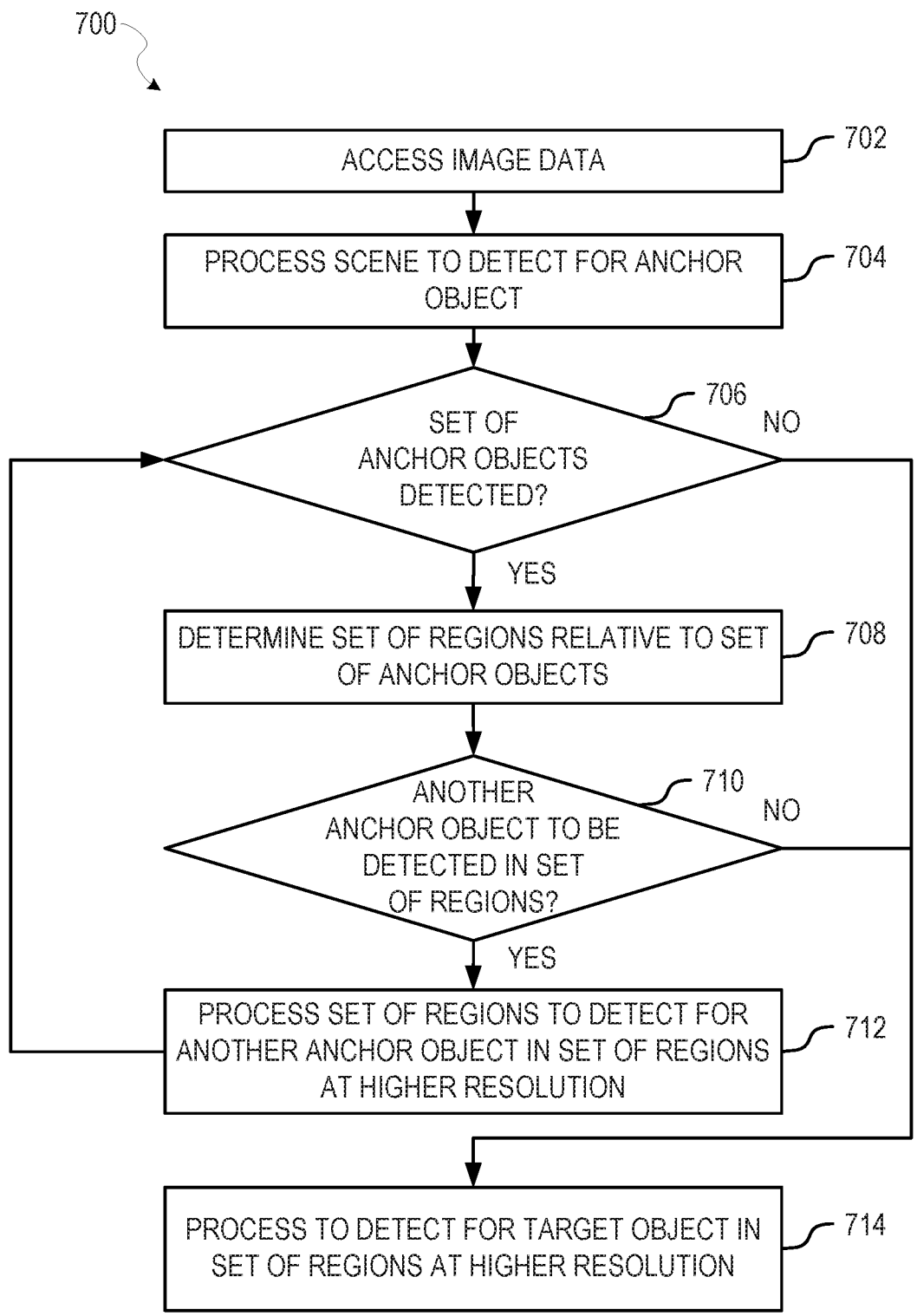
FIGS. 7 and 8 are flowcharts illustrating example methods for object detection based on object relation, according to various embodiments of the present disclosure.
Figure 8:
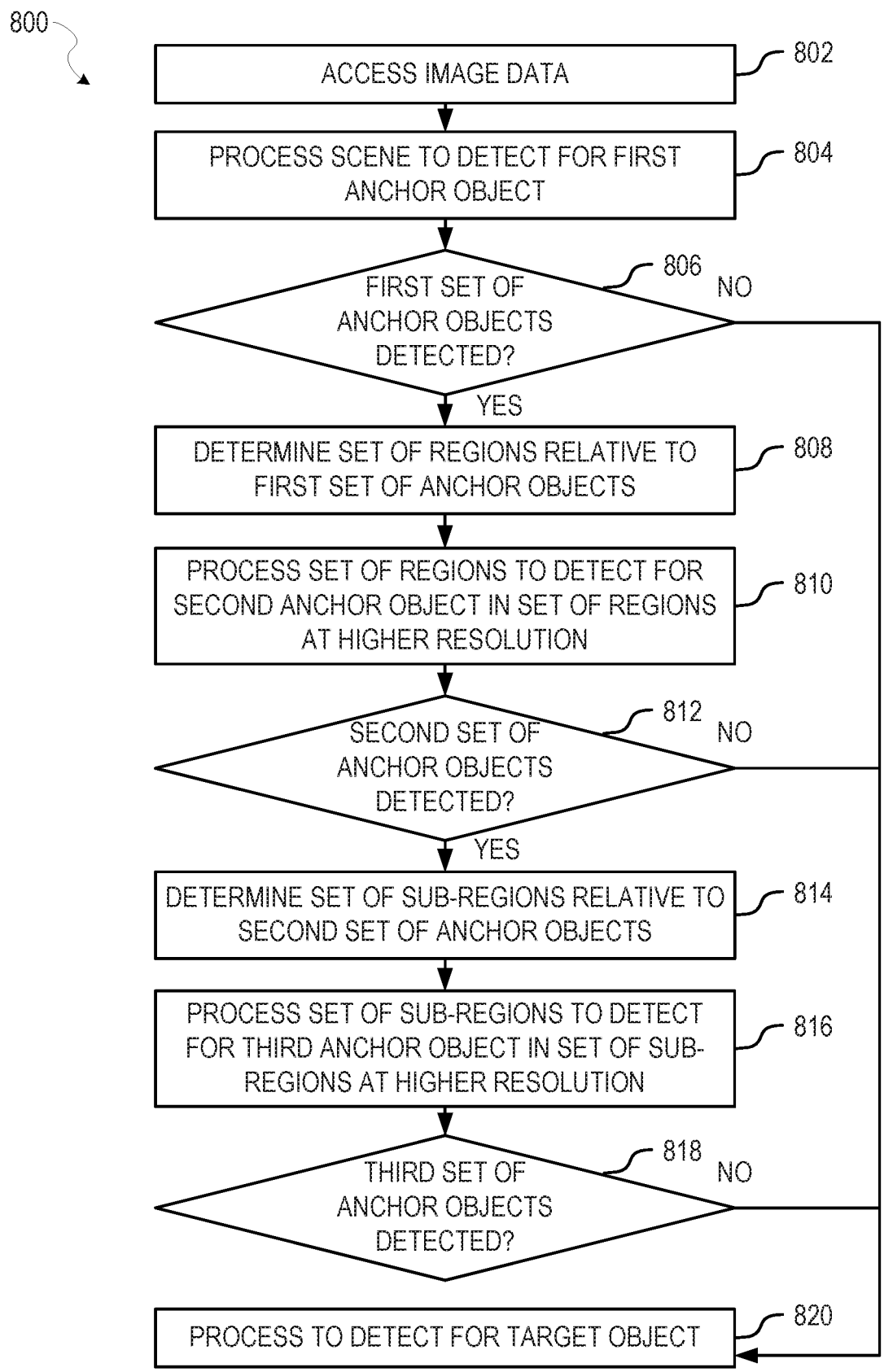

FIGS. 7 and 8 are flowcharts illustrating example methods 700, 800 for object detection based on object relation, according to various embodiments of the present disclosure. For some embodiments, at least one of the methods 700, 800 is performed, at least in part, by a system such as the object detection system 100 described above with respect to FIG. 1. An operation of the methods 700, 800 (or another method described herein) may be performed by a hardware processor (e.g., a central processing unit or graphics processing unit) of a computing device a desktop, server, laptop, mobile phone, tablet, etc.), which may be part of a computing system based on a cloud architecture.

Referring now to FIG. 7, the method 700 begins with operation 702, where an object detection system (e.g., 100) accesses image data that comprises an initial image depicting a scene in which a target object is to be searched. As noted herein, the initial image can be generated by down-sampling an original image captured by the digital image capture device. The scene can comprise, for example, one captured by a digital image capture device (e.g., digital still or video camera) in a real-world environment. Subsequently, at operation 704, the object detection system processes the scene (depicted by the original digital image) to detect for an anchor object (e.g., a first anchor object for a first level of object detection). As described herein, the scene can be processed using a machine learning (ML) model, such as a convolution neural network (CNN). Depending on the embodiment, the object detection system can use a single ML model (e.g., single CNN), or different ML models (e.g., two different CNNs), to detect for different types of anchor objects.

The method 700 continues with operation 706, where in response to operation 704 causing detection of a set of anchor objects (e.g., detection by operation 704 of a first set of anchor objects depicted in the scene), the method 700 continues with the object detection system performing operation 708. In response to operation 704 not causing detection of a set of anchor objects, the method 700 continues with the object detection system performing operation 714.

At operation 708, the method 700 continues by the object detection system determining (e.g., identifying or defining) a set of regions (e.g., bound boxes) relative to the set of anchor objects detected by operation 704. For some embodiments, this is performed by identifying, for each particular anchor object in the set of anchor objects, a region (e.g., of the scene) relative to the particular anchor object. As described herein, operation 708 can involve use of a region predictor system that can determine (e.g., define) a bounding box around a given object (e.g., a given anchor object in the set of anchor objects).

Thereafter, the method 700 continues with operation. 710, where in response to determining that another anchor object is to be detected in the set of regions last determined by operation 708, the method 700 continues with the object detection system performing operation 712. In response to determining that another anchor object is not to be detected in the set of regions last determined by operation 708, the method 700 continues with the object detection system performing operation 714.

At operation 712, the method 700 continues by the object detection system processing the set of regions (last determined by operation 708) to detect for another anchor object (not detected for by a previous operation) in the set of regions at a higher resolution. For some embodiments, each region in the set of regions is processed to detect for another anchor object (e.g., a second anchor object for a second level of detection). Additionally, for some embodiments, processing a given region (in the set of regions) to detect for another anchor object (e.g., second anchor object) at a higher resolution comprises resizing the given region from its current resolution to a higher resolution, and then detecting for the other anchor object (e.g., second anchor object) in the resized given region. As described herein, a given region can be processed using a machine learning (ML) model, and either a single ML model or different ML models can be used to detect for different types of anchor objects.

After processing the set of regions at operation 712, the method 700 can return to operation 706 to determine whether operation 712 caused a set of anchor objects to be detected in the set of regions. Thereafter, the method 700 can continue as before with operations 708 and 710.

Eventually, at operation 714, the method 700 continues by the object detection system processing the set of regions (last determined by operation 708) to detect for the target object. For some embodiments, each region in the set of regions is processed to detect for the target object. Additionally, for some embodiments, processing a given region (in the set of regions) to detect for the target object at a higher resolution comprises resizing (e.g., up-sampling) the given region from its current resolution to a higher resolution, and then detecting for the target object in the resized given region. Resizing the given region can comprise generation of a new image based on the given region. As described herein, a given region can be processed using a machine learning (ML) model, such as a convolution neural network (CNN).

Referring now to FIG. 8, the method 800 illustrates an object detection process that involves detection of a target object using at least two levels of anchor objects (e.g., a first anchor object and a second anchor object), according to various embodiments of the present disclosure. As shown, the method 800 begins with operation 802, where an object detection system (e.g., 100) accesses image data that comprises an initial image depicting a scene in which a target object is to be searched. The method 800 continues with operation 804, where the object detection system processing the scene (depicted by the original digital image) to detect for a first anchor object.

The method 800 continues with operation 806, where in response to operation 804 causing detection of a first set of anchor objects in the scene, the method 800 continues with the object detection system performing operation 808. In response to operation 804 not causing detection of a first set of anchor objects in the scene, the method 800 continues with the object detection system performing operation 820.

At operation 808, the method 800 continues by the object detection system determining (e.g., identifying or defining) a set of regions (e.g., bound boxes) relative to the first set of anchor objects detected h operation 804. At operation 810, the method 800 continues by the object detection system processing the set of regions (determined by operation 808) to detect for a second anchor object (not detected for by a previous operation) in the first set of regions at a higher resolution.

The method 800 continues with operation 812, where in response to operation 810 causing detection of a second set of anchor objects in the set of regions, the method 800 continues with the object detection system performing operation 814. In response to operation 810 not causing detection of a second set of anchor objects in the set of regions, the method 800 continues with the object detection system performing operation 820.

At operation 814, the method 800 continues by the object detection system determining a set of sub-regions (e.g., bound boxes) relative to the second set of anchor objects detected by operation 810. At operation 816, the method 800 continues by the object detection system processing the set of sub-regions (determined by operation 814) to detect for a third anchor object (not detected for by a previous operation) in the set of sub-regions at a higher resolution.

The method 800 continues with operation 818, where in response to operation 816 causing detection of a third set of anchor objects in the set of sub-regions, the object detection system continues by performing operations similar to 808 through 812 (though not shown). In response to operation 816 not causing detection of a third set of anchor objects in the set of sub-regions, the method 800 continues with the object detection system performing operation 820.

Figure 9:
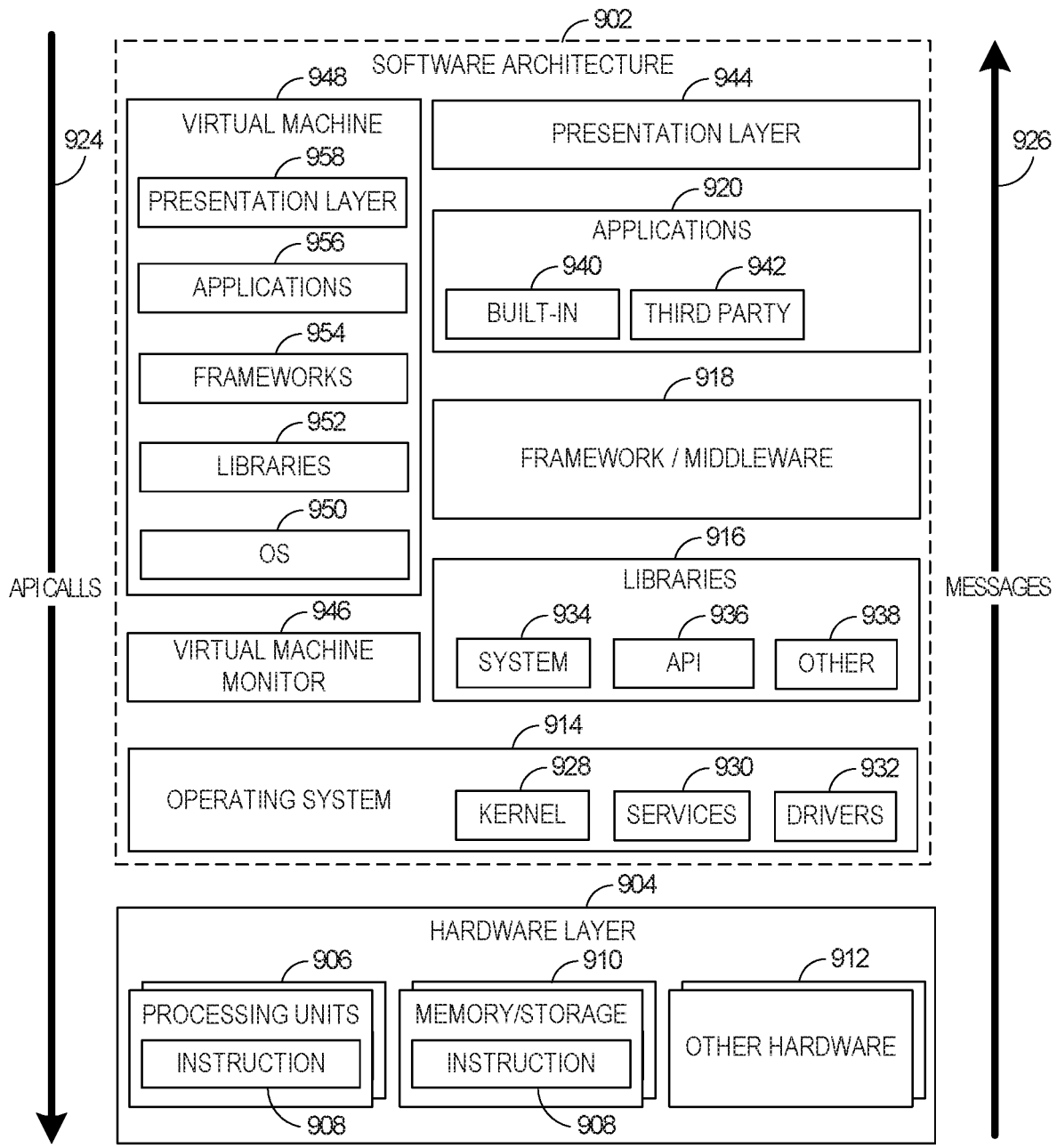
FIG. 9 is a block diagram illustrating a representative software architecture, which may be used in conjunction with various hardware architectures herein described, according to various embodiments of the present disclosure.
Figure 10:
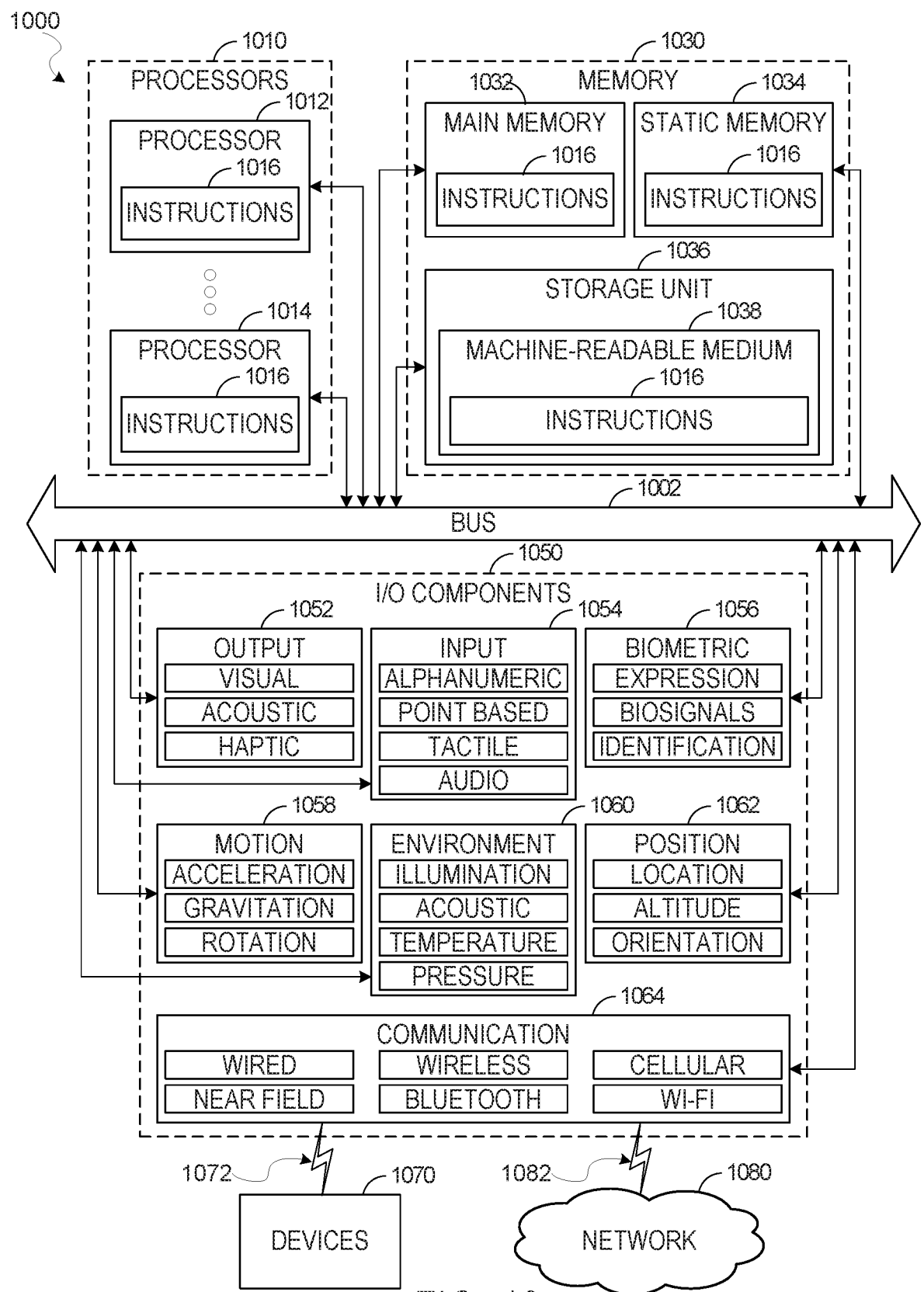
FIG. 10 is a block diagram illustrating components of a machine able to read instructions from a machine storage medium and perform any one or more of the methodologies discussed herein according to various embodiments of the present disclosure.

Various embodiments described herein can be implemented by way of the example software architecture illustrated by and described with respect to FIG. 9 or by way of the example machine illustrated by and described with respect to FIG. 10.

FIG. 9 is a block diagram illustrating an example of a software architecture 902 that can be installed on a machine, according to some example embodiments. FIG. 9 is merely a non-limiting example of a software architecture, and it will be appreciated that many other architectures can be implemented to facilitate the functionality described herein. The software architecture 902 can be executing on hardware such as a machine 1000 of FIG. 10 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. The executable instructions 908 represent the executable instructions of the software architecture 902, including implementation of the systems, modules, methods, and so forth of FIGS. 1, 2, 7, and 8. The hardware layer 904 also includes memory or storage modules 910, which also have the executable instructions 908. The hardware layer 904 can also comprise other hardware 912, which represents any other hardware of the hardware layer 904, such as the other hardware illustrated as part of the machine 1000.

In the example architecture of FIG. 9, the software architecture 902 can be conceptualized as a stack of layers, where each layer provides particular functionality. For example, the software architecture 902 can include layers such as an operating system 914, libraries 916, frameworks/middleware 918, applications 920, and a presentation layer 944. Operationally, the applications 920 or other components within the layers can invoke API calls 924 through the software stack and receive a response, returned values, and so forth (illustrated as messages 926) in response to the API calls 924. The layers illustrated are representative in nature, and not all software architectures have all layers. For example, some mobile or special-purpose operating systems may not provide a frameworks/middleware 918 layer, while others may provide such a layer. Other software architectures can include additional or different layers.

The operating system 914 can manage hardware resources and provide common services. The operating system 914 can include, for example, a kernel 928, services 930, and drivers 932. The kernel 928 can act as an abstraction layer between the hardware and the other software layers. For example, the kernel 928 can be responsible for memory management, processor management (e.g., scheduling), component management, networking, security settings, and so on. The services 930 can provide other common services for the other software layers. The drivers 932 can be responsible for controlling or interfacing with the underlying hardware. For instance, the drivers 932 can include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 can provide a common infrastructure that can be utilized by the applications 920 and/or other components and/or layers. The libraries 916 typically provide functionality that allows other software modules to perform tasks in an easier fashion than by interfacing directly with the underlying operating system 914 functionality (e.g., kernel 928, services 930, or drivers 932). The libraries 916 can include system libraries 934 (e.g., C standard library) that can provide functions such as memory allocation functions, string manipulation functions, mathematic functions, and the like. In addition, the libraries 916 can include API libraries 936 such as media libraries (e.g., libraries to support presentation and manipulation of various media formats such as MPEG4, H.264, MP3, AAC, AMR, JPG, and PNG), graphics libraries (e.g., an OpenGL framework that can be used to render 2D and 3D graphic content on a display), database libraries (e.g., SQLite that can provide various relational database functions), web libraries (e.g., WebKit that can provide web browsing functionality), and the like. The libraries 916 can also include a wide variety of other libraries 938 to provide many other APIs to the applications 920 and other software components/modules.

The frameworks 918 (also sometimes referred to as middleware) can provide a higher-level common infrastructure that can be utilized by the applications 920 or other software components/modules. For example, the frameworks 918 can provide various graphic user interface (GUI)

functions, high-level resource management, high-level location services, and so forth. The frameworks 918 can provide a broad spectrum of other APIs that can be utilized by the applications 920 and/or other software components/modules, some of which can be specific to a particular operating system or platform.

The applications 920 include built-in applications 940 and/or third-party applications 942. Examples of representative built-in applications 940 can include, but are not limited to, a home application, a contacts application, a browser application, a book reader application, a location application, a media application, a messaging application, or a game application.

The third-party applications 942 can include any of the built-in applications 940, as well as a broad assortment of other applications. In a specific example, the third-party applications 942 (e.g., an application developed using the Android™ or iOS™ software development kit (SDK) by an entity other than the vendor of the particular platform) can be mobile software running on a mobile operating system such as iOS™, Android™, Windows Phone, or other mobile operating systems. In this example, the third-party applications 942 can invoke the API calls 924 provided by the mobile operating system such as the operating system 914 to facilitate functionality described herein.

The applications 920 can utilize built-in operating system functions (e.g., kernel 928, services 930, or drivers 932), libraries (e.g., system libraries 934, API libraries 936, and other libraries 938), or frameworks/middleware 918 to create user interfaces to interact with users of the system. Alternatively, or additionally, in some systems, interactions with a user can occur through a presentation layer, such as the presentation layer 944. In these systems, the application/module "logic" can be separated from the aspects of the application/module that interact with the user.

Some software architectures utilize virtual machines. In the example of FIG. 9, this is illustrated by a virtual machine 948. The virtual machine 948 creates a software environment where applications/modules can execute as if they were executing on a hardware machine (e.g., the machine 1000 of FIG. 10). The virtual machine 948 is hosted by a host operating system (e.g., the operating system 914) and typically, although not always, has a virtual machine monitor 946, which manages the operation of the virtual machine 948 as well as the interface with the host operating system (e.g., the operating system 914). A software architecture executes within the virtual machine 948, such as an operating system 950, libraries 952, frameworks/middleware 954, applications 956, or a presentation layer 958. These layers of software architecture executing within the virtual machine 948 can be the same as corresponding layers previously described or may be different.

FIG. 10 illustrates a diagrammatic representation of a machine 1000 in the form of a computer system within which a set of instructions can be executed for causing the machine 1000 to perform any one or more of the methodologies discussed herein, according to an embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. For example, the instructions 1016 can cause the machine 1000 to execute the method 700 of FIG. 7, or the method 800 of FIG. 8. Additionally, or alternatively, the instructions 1016 can implement FIGS. 1 and 2. The instructions 1016 transform the general, non-programmed machine 1000 into a particular machine 1000 programmed to carry out the described and illustrated functions in the manner described. In alternative embodiments, the machine 1000 operates as a standalone device or can be coupled (e.g., networked) to other machines. In a networked deployment, the machine 1000 can operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory 1030, and I/O components 1050, which can be configured to communicate with each other such as via a bus 1002. In an embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) can include, for example, a processor 1012 and a processor 1014 that can execute the instructions 1016. The term "processor" is intended to include multi-core processors that can comprise two or more independent processors (sometimes referred to as "cores") that can execute instructions contemporaneously. Although FIG. 10 shows multiple processors 1010, the machine 1000 can include a single processor with a single core, a single processor with multiple cores (e.g., a multi-core processor), multiple processors with a single core, multiple processors with multiples cores, or any combination thereof.

The memory 1030 can include a main memory 1032, a static memory 1034, and a storage unit 1036 including machine-readable medium 1038, each accessible to the processors 1010 such as via the bus 1002. The main memory 1032, the static memory 1034, and the storage unit 1036 store the instructions 1016 embodying any one or more of the methodologies or functions described herein. The instructions 1016 can also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 can include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the components 1050 can include many other components that are not shown in FIG. 10. The I/O components 1050 are grouped according to functionality merely for simplifying the following discussion, and the grouping is in no way limiting. In various embodiments, the I/O components 1050 can include output components 1052 and input components 1054. The output components 1052 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 1050 can include biometric components 1056, motion components 1058, environmental components 1060, or position components 1062, among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 can include acceleration sensor components (e.g., accelerometer), gravitation sensor components, rotation sensor components (e.g., gyroscope), and so forth. The environmental components 1060 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 1062 can include location sensor components (e.g., a Global Positioning System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1050 can include communication components 1064 operable to couple the machine 1000 to a network 1080 or devices 1070 via a coupling 1082 and a coupling 1072, respectively. For example, the communication components 1064 can include a network interface component or another suitable device to interface with the network 1080. In further examples, the communication components 1064 can include wired communication components, wireless communication components, cellular communication components, near field communication (NFU) components, Bluetooth® components (e.g., Bluetooth® Low Energy), Wi-Fi® components, and other communication components to provide communication via other modalities. The devices 1070 can be another machine or any of a wide variety of peripheral devices (e.g., a peripheral device coupled via a USB).

Moreover, the communication components 1064 can detect identifiers or include components operable to detect identifiers. For example, the communication components 1064 can include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1064, such as location via Internet Protocol (IP) geolocation, location via Wi-Fi® signal triangulation, location via detecting an NFC beacon signal that can indicate a particular location, and so forth.

Executable Instructions and Machine Storage Medium

The various memories (i.e., 1030, 1032, 1034, and/or the memory of the processor(s) 1010) and/or the storage unit 1036 can store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and can be used interchangeably. The terms refer to a single or multiple storage devices and/or media (e.g., a centralized or distributed database, and/or associated caches and servers) that store executable instructions 1016 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 1080 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 can include a wireless or cellular network, and the coupling 1082 can be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 can be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 can be transmitted or received using a transmission medium via the coupling 1072 (e.g., a peer-to-peer coupling) to the devices 1070. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term or may be constructed in either an inclusive or exclusive sense. The terms "a" or "an" should be read as meaning "at least one," "one or more," or the like. The presence of broadening words and phrases such as "one or more", "at least," "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

Examples

Example 1 is a method comprising: accessing, by one or more hardware processors, image data that comprises an initial image, the initial image depicting a scene in which a target object is to be searched; processing, by the one or more hardware processors, the scene to detect for a first anchor object depicted in the scene, the first anchor object relating to the target object; and in response to the processing of the scene, causing detection of a first set of anchor objects depicted in the scene by at least: determining, by the one or more hardware processors, a set of regions of the scene by identifying, for each particular anchor object in the first set of anchor objects, a region of the scene relative to the particular anchor object; and for a particular region, in the set of regions, having a first resolution: determining, by the one or more hardware processors, whether a second anchor object is to be detected for in the particular region, the second anchor object relating to the target object; and in response to determining that the second anchor object is to be detected for in the particular region: processing, by the one or more hardware processors, the particular region at a second resolution to detect for the second anchor object depicted in the particular region, the second resolution being one of higher than or equal to the first resolution; and detecting, by the one or more hardware processors, for the target object in the particular region based on whether the processing of the particular region at the second resolution causes detection of a second set of anchor objects in the particular region.

In Example 2, the subject matter of Example 1 optionally includes where a first detection rate of the first anchor object by the processing of the initial image is higher than a second detection rate of the second anchor object by the processing of the particular region.

In Example 3, the subject matter of Example 1 or Example 2 optionally includes where the detecting for the target object in the particular region based on whether the processing of the particular region at the second resolution causes detection of the second set of anchor objects in the particular region comprises: in response to the processing of the particular region at the second resolution not causing the detection of the second set of anchor objects in the particular region, processing the particular region to detect for the target object in the particular region of the scene.

In Example 4, the subject matter of Example 1 or Example 3 optionally includes where the detecting for the target object in the particular region based on whether the processing of the particular region at the second resolution causes detection of the second set of anchor objects in the particular region comprises: in response to the processing of the particular region at the second resolution causing detection of the second set of anchor objects in the particular region: determining a set of sub-regions of the particular region by identifying, for each given anchor object in the second set of anchor objects, a sub-region of the particular region relative to the given anchor object; and for a given sub-region, in the set of sub-regions, having a third resolution: determining whether a third anchor object is to be detected for in the given sub-region, the third anchor object relating to the target object; and in response to determining that the third anchor object is to be detected for in the given sub-region: processing the given sub-region at a fourth resolution to detect for the third anchor object depicted in the given sub-region of the particular region, the fourth resolution being one of higher than or equal to the third resolution; and detecting for the target object in the given sub-region of the particular region based on whether the processing of the given sub-region at the fourth resolution causes detection of a third set of anchor objects in the given sub-region of the particular region.

In Example 5, the subject matter of any one of Examples 1 to 4 optionally includes where the detecting for the target object in the given sub-region based on whether the processing of the given sub-region at the fourth resolution causes detection of the third set of anchor objects in the given sub-region of the particular region comprises: in response to the processing of the given sub-region at the fourth resolution not detecting the third set of anchor objects in the given sub-region, processing the given sub-region to detect for the target object in the given sub-region of the particular region.

In Example 6, the subject matter of any one of Examples 1 to 5 optionally includes where for the particular anchor object, the identifying the region of the scene relative to the particular anchor object comprises: determining a bounding box relative to the particular anchor object, the bounding box defining the region.

In Example 7, the subject matter of any one of Examples 1 to 6 optionally includes where for the particular anchor object, the identifying the region of the scene relative to the particular anchor object comprises: processing, by a machine learning model for region predication, the scene to identify the region.

In Example 8, the subject matter of any one of Examples 1 to 11 optionally includes where the first anchor object comprises a human individual.

In Example 9, the subject matter of any one of Examples 1 to 8 optionally includes where the second anchor object comprises at least one of a human hand or a human head.

In Example 10, the subject matter of any one of Examples 1 to 9 optionally includes where the first anchor object comprises a vehicle.

In Example 11, the subject matter of any one of Examples 1 to 10 optionally includes where the second anchor object comprises at least one of a vehicle operator or a vehicle component.

In Example 12, the subject matter of any one of Examples 1 to 11 optionally includes where the processing of the particular region at the second resolution comprises: resizing the particular region from the first resolution to the second resolution; and processing the resized particular region to detect for the second anchor object depicted in the resized particular region.

In Example 13, the subject matter of any one of Examples 1 to 12 optionally includes where the first anchor object and the second anchor object are selected from a hierarchy of anchor objects related to the target object.

In Example 14, the subject matter of any one of Examples 1 to 13 optionally includes where the processing the scene to detect for the first anchor object depicted in the scene comprises: processing, by a first machine learning del, the scene to detect for the first anchor object depicted in the scene.

In Example 15, the subject matter of any one of Examples 1 to 14 optionally includes where the processing the particular region at the second resolution to detect for the second anchor object depicted in the particular region comprises: processing, by a second machine learning model, the scene to detect for the second anchor object depicted in the particular region.

Example 16 is a non-transitory computer storage medium comprising instructions that, when executed by a hardware processor of a device, cause the device to perform operations comprising: accessing image data that comprises an initial image, the initial image depicting a scene in which a target object is to be searched; determining, based on the image data, a set of search regions of the scene, the determining comprising performing at least a single iteration of sub-operations, the single iteration of sub-operations comprising: detecting for a new anchor object depicted within the scene, the new anchor object not being detected for by a prior iteration, and the new anchor object relating to the target object; responsive to the detecting for the new anchor object causing detection of one or more anchor objects: determining one or more regions of the scene relative to the one or more anchor objects; resizing each of the one or more regions to a higher resolution; determining whether another new anchor object is to be detected for in the resized one or more regions, the other new anchor object having not been detected for by a prior iteration, and the other new anchor object relating to the target object; and based on the determining whether the other new anchor object is to be detected for in the resized one or more regions, causing another single iteration of the sub-operations to be performed for each of the resized one or more regions; and processing each particular search region in the set of search regions to detect for the target object in the particular search region, the set of search regions comprising at least one region from the one or more regions.

In Example 17, the subject matter of Example 16 optionally includes where based on the determining whether the other new anchor object is to be detected for in the resized one or more regions, the causing the other single iteration of the sub-operations to be performed for each of the resized one or more regions comprises: in response to determining that the other new anchor is to be detected for in the resized one or more regions, performing the other single iteration of sub-operations for each of the resized one or more regions.

In Example 18, the subject matter of Example 16 or Example 17 optionally includes where based on the determining whether the other new anchor object is to be detected for in the resized one or more regions, the causing the other single iteration of the sub-operations to be performed for each of the resized one or more regions comprises: in response to determining that the other new anchor is not to be detected for in the resized one or more regions, ending the single iteration.

Example 19 is a system comprising: a data source for providing image data, the image data comprising an initial image depicting a scene in which a target object is to be searched; a memory storing instructions; and one or more hardware processors communicatively coupled to the memory and configured by the instructions to perform operations comprising: processing the scene to detect for a first anchor object depicted in the scene, the first anchor object relating to the target object; and in response to the processing of the scene, causing detection of a first set of anchor objects depicted in the scene by at least: determining a set of regions of the scene by identifying, for each particular anchor object in the first set of anchor objects, a region of the scene relative to the particular anchor object; and for a particular region, in the set of regions, having a first resolution: processing the particular region at a second resolution to detect for a second anchor object depicted in the particular region, the second resolution being one of higher than or equal to than the first resolution; and detecting for the target object in the particular region based on whether the processing of the particular region at the second resolution causes detection of a second set of anchor objects in the particular region.

In Example 20, the subject matter of Example 19 optionally includes where the detecting for the target object in the particular region based on whether the processing of the particular region at the second resolution causes detection of the second set of anchor objects in the particular region comprises: in response to the processing of the particular region at the second resolution causing detection of the second set of anchor objects in the particular region: determining a set of sub-regions of the particular region by identifying, for each given anchor object in the second set of anchor objects, a sub-region of the particular region relative to the given anchor object; and for a given sub-region, in the set of sub-regions, having a third resolution: processing the given sub-region at a fourth resolution to detect for a third anchor object depicted in the given sub-region of the particular region, the fourth resolution being one of higher than or equal to the third resolution; and detecting for the target object in the given sub-region of the particular region based on whether the processing of the given sub-region at the fourth resolution causes detection of a third set of anchor objects in the given sub-region of the particular region.

What is claimed is:

1. A method comprising:
   accessing, by one or more hardware processors, image data that comprises an initial image, the initial image depicting a scene in which a target object is to be searched;
   processing, by the one or more hardware processors, the scene to detect for a first anchor object depicted in the scene, the first anchor object relating to the target object; and
   in response to the processing of the scene, causing detection of a first set of anchor objects depicted in the scene by at least:
      determining, by the one or more hardware processors, a set of regions of the scene by identifying, for each particular anchor object in the first set of anchor objects, a region of the scene relative to the particular anchor object; and
      for a particular region, in the set of regions, having a first resolution:
         determining, by the one or more hardware processors, whether a second anchor object is to be detected for in the particular region, the second anchor object relating to the target object; and
         in response to determining that the second anchor object is to be detected for in the particular region:
            processing, by the one or more hardware processors, the particular region at a second resolution to detect for the second anchor object depicted in the particular region, the second resolution being one of higher than or equal to the first resolution; and
            detecting, by the one or more hardware processors, for the target object in the particular region based on whether the processing of the particular region at the second resolution causes detection of a second set of anchor objects in the particular region.

2. The method of claim 1, wherein a first detection rate of the first anchor object by the processing of the initial image is higher than a second detection rate of the second anchor object by the processing of the particular region.

3. The method of claim 1, wherein the detecting for the target object in the particular region based on whether the processing of the particular region at the second resolution causes detection of the second set of anchor objects in the particular region comprises:
   in response to the processing of the particular region at the second resolution not causing the detection of the second set of anchor objects in the particular region, processing the particular region to detect for the target object in the particular region of the scene.

4. The method of claim 1, wherein the detecting for the target object in the particular region based on whether the processing of the particular region at the second resolution causes detection of the second set of anchor objects in the particular region comprises:
   in response to the processing of the particular region at the second resolution causing detection of the second set of anchor objects in the particular region:
      determining a set of sub-regions of the particular region by identifying, for each given anchor object in the second set of anchor objects, a sub-region of the particular region relative to the given anchor object; and
      for a given sub-region, in the set of sub-regions, having a third resolution:
         determining whether a third anchor object is to be detected for in the given sub-region, the third anchor object relating to the target object; and
         in response to determining that the third anchor object is to be detected for in the given sub-region:
            processing the given sub-region at a fourth resolution to detect for the third anchor object depicted in the given sub-region of the particular region, the fourth resolution being one of higher than or equal to the third resolution; and
            detecting for the target object in the given sub-region of the particular region based on whether the processing of the given sub-region at the fourth resolution causes detection of a third set of anchor objects in the given sub-region of the particular region.

5. The method of claim 4, wherein the detecting for the target object in the given sub-region based on whether the processing of the given sub-region at the fourth resolution causes detection of the third set of anchor objects in the given sub-region of the particular region comprises:
   in response to the processing of the given sub-region at the fourth resolution not detecting the third set of anchor objects in the given sub-region, processing the given sub-region to detect for the target object in the given sub-region of the particular region.

6. The method of claim 1, wherein for the particular anchor object, the identifying the region of the scene relative to the particular anchor object comprises:
  determining a bounding box relative to the particular anchor object, the bounding box defining the region.

7. The method of claim 1, wherein for the particular anchor object, the identifying the region of the scene relative to the particular anchor object comprises:
  processing, by a machine learning model for region predication, the scene to identify the region.

8. The method of claim 1, wherein the first anchor object comprises a human individual.

9. The method of claim 8, wherein the second anchor object comprises at least one of a human hand or a human head.

10. The method of claim 1, wherein the first anchor object comprises a vehicle.

11. The method of claim 10, wherein the second anchor object comprises at least one of a vehicle operator or a vehicle component.

12. The method of claim 1, wherein the processing of the particular region at the second resolution comprises:
  resizing the particular region from the first resolution to the second resolution; and
  processing the resized particular region to detect for the second anchor object depicted in the resized particular region.

13. The method of claim 1, wherein the first anchor object and the second anchor object are selected from a hierarchy of anchor objects related to the target object.

14. The method of claim 1, wherein the processing the scene to detect for the first anchor object depicted in the scene comprises:
  processing, by a first machine learning model, the scene to detect for the first anchor object depicted in the scene.

15. The method of claim 14, wherein the processing the particular region at the second resolution to detect for the second anchor object depicted in the particular region comprises:
  processing, by a second machine learning model, the scene to detect for the second anchor object depicted in the particular region.

16. A non-transitory computer storage medium comprising instructions that, when executed by a hardware processor of a device, cause the device to perform operations comprising:
  accessing image data that comprises an initial image, the initial image depicting a scene in which a target object is to be searched;
  determining, based on the image data, a set of search regions of the scene, the determining comprising performing at least a single iteration of sub-operations, the single iteration of sub-operations comprising:
    detecting for a new anchor object depicted within the scene, the new anchor object not being detected for by a prior iteration, and the new anchor object relating to the target object;
    responsive to the detecting for the new anchor object, causing detection of one or more anchor objects by:
      determining one or more regions of the scene relative to the one or more anchor objects;
      resizing each of the one or more regions to a higher resolution;
      determining whether another new anchor object is to be detected for in the resized one or more regions, the other new anchor object having not been detected for by a prior iteration, and the other new anchor object relating to the target object; and
      based on the determining whether the other new anchor object is to be detected for in the resized one or more regions, causing another single iteration of the sub-operations to be performed for each of the resized one or more regions; and
  processing each particular search region in the set of search regions to detect for the target object in the particular search region, the set of search regions comprising at least one region from the one or more regions.

17. The non-transitory computer storage medium of claim 16, wherein based on the determining whether the other new anchor object is to be detected for in the resized one or more regions, the causing the other single iteration of the sub-operations to be performed for each of the resized one or more regions comprises:
  in response to determining that the other new anchor is to be detected for in the resized one or more regions, performing the other single iteration of sub-operations for each of the resized one or more regions.

18. The non-transitory computer storage medium of claim 16, wherein based on the determining whether the other new anchor object is to be detected for in the resized one or more regions, the causing the other single iteration of the sub-operations to be performed for each of the resized one or more regions comprises:
  in response to determining that the other new anchor is not to be detected for in the resized one or more regions, ending the single iteration.

19. A system comprising:
  a data source for providing image data, the image data comprising an initial image depicting a scene in which a target object is to be searched;
  a memory storing instructions; and
  one or more hardware processors communicatively coupled to the memory and configured by the instructions to perform operations comprising:
    processing the scene to detect for a first anchor object depicted in the scene, the first anchor object relating to the target object; and
    in response to the processing of the scene, causing detection of a first set of anchor objects depicted in the scene by at least:
      determining a set of regions of the scene by identifying, for each particular anchor object in the first set of anchor objects, a region of the scene relative to the particular anchor object; and
      for a particular region, in the set of regions, having a first resolution:
        processing the particular region at a second resolution to detect for a second anchor object depicted in the particular region, the second resolution being one of higher than or equal to the first resolution; and
        detecting for the target object in the particular region based on whether the processing of the particular region at the second resolution causes detection of a second set of anchor objects in the particular region.

20. The system of claim 19, wherein the detecting for the target object in the particular region based on whether the processing of the particular region at the second resolution causes detection of the second set of anchor objects in the particular region comprises:

in response to the processing of the particular region at the second resolution causing detection of the second set of anchor objects in the particular region:
determining a set of sub-regions of the particular region by identifying, for each given anchor object in the second set of anchor objects, a sub-region of the particular region relative to the given anchor object; and
for a given sub-region, in the set of sub-regions, having a third resolution:
processing the given sub-region at a fourth resolution to detect for a third anchor object depicted in the given sub-region of the particular region, the fourth resolution being one of higher than or equal to the third resolution; and
detecting for the target object in the given sub-region of the particular region based on whether the processing of the given sub-region at the fourth resolution causes detection of a third set of anchor objects in the given sub-region of the particular region.

* * * * *